2,377,350

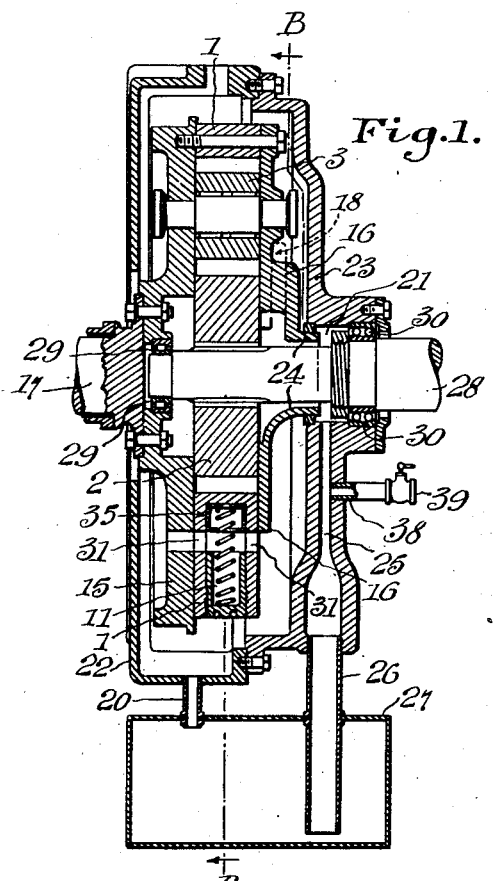
June 5, 1945.  J. W. MARSH  2,377,350
POWER TRANSMITTING MECHANISM
Filed June 17, 1942
INVENTOR
JOHN W. MARSH
BY
ATTORNEYS Patented June 5, 1945

UNITED STATES PATENT OFFICE 2,377,350

POWER-TRANSMITTING MECHANISM

John W. Marsh, Alexandria, Va.

Application June 17, 1942, Serial No. 447,478

8 Claims. (Cl. 192—61)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to power transmitting mechanism and more particularly to an automatic valve for hydraulic clutches suitable for power take-off from a prime mover or other application where it is desired to transmit rotary motion and power.

It is an object of this invention to provide a clutch which is free from mechanical friction and, therefore, has no parts which would have to be replaced in service, and which has slipping characteristics within a certain predetermined speed range below which power is not transmitted, whereby the prime mover will not be stalled by the application of overload.

It is a further object of my invention to provide a clutch the operation of which will be automatic and controlled by the relative speed of the driving and driven shafts. For example, when applied to an engine, as the throttle is opened and the engine speed advanced, the clutch begins to engage, accelerating the speed of the load and retarding engine speed until the driving and driven shafts are rotating at the top of the predetermined speed range for slipping, when the clutch is completely engaged and the load driven at engine speed.

Another object of my invention is to provide an inherently overrunning clutch by which the load is transmitted through an oil cushion at all speeds and harmful torsional vibrations are thereby eliminated.

These and other objects of my invention will become apparent upon a consideration of the following detailed description of an embodiment of a clutch incorporating my improved valve when taken in conjunction with the accompanying drawing in which:

Fig. 1 is a cross-section of a clutch taken along the line A—A of Fig. 2;

Fig. 2 is an elevation of the clutch from the driven side which has been partially broken away generally along the line B—B of Fig. 1;

Fig. 3 is an enlarged cross-section of the valve mechanism; and

Fig. 4 is a cross-section of a modified form of valve.

Referring to Figs. 1 and 2 it will be seen that my improved valve is incorporated in a rotary epicyclic gear pump. The pump is essentially of standard construction and has a casing 1, containing a central space into which a gun gear 2 is closely fitted. Spaced around the sun gear 2 are a plurality of planetary pinions 3, each closely fitted into their respective spaces in casing 1 and meshing with the sun gear 2. The discharge from the gears is fed through valve intake ports 7 which connect with each pinion space and open to their respective valve chambers 11 projecting outwardly from the casing 1 and open at their outer ends. The valve chambers 11 have sleeves 34 threadably mounted therein, which sleeves 34 are closed at their outer ends by caps 37 provided with kerfs 37' adapted to be engaged by a suitable tool, whereby the sleeves 34 may be adjusted in the valve chambers 11 for a purpose which will hereinafter appear. The casing 1 is secured between cover plates 15 and 16. In the embodiment disclosed in the drawing, plate 15 is the flywheel of the prime mover and is attached to crankshaft 17. Plate 16 contains ports 18 extending radially from the central inlet and connecting with the suction side of their respective pinions. Surrounding the above described rotary mechanism is an external housing 22, in the instant application the flywheel housing of the prime mover. The external housing 22 is enclosed on one side by the crankcase of the prime mover and on the other side by a cover 23, the combination forming an oiltight enclosure in which the aforesaid epicyclic gear pump revolves. A circular flange 24 extends axially through cover 23 into space 21, the joint between being suitably sealed. Passage 25 and conduit 26 connect the annular space 21 with reservoir 27. An opening 38 is provided in passage 25 and is controlled by valve 39 to controllably vent passage 25 thereby breaking the pump suction. A conduit 20 is also provided, connecting the external housing 22 with reservoir 27. Sun gear 2 is mounted on an output shaft 28 and splined thereto. Output shaft 28 is suitably mounted in bearings 29 and 30 and the fit between shaft 28 and cover 23 is suitably packed to seal the joint.

If the device is used as a completely free running clutch, the valve 39 is used to break the vacuum. The valve may also be used in an emergency to free the clutch under load.

Discharge ports 31 are also provided in valve chambers 11. Arranged within each valve chamber 11 are a centrifugally operated sleeve valve 35 containing an opening 35' and a spring 36, the construction and operation of which will be clear from a consideration of Fig. 3. By adjusting the sleeves 34 in the valve chambers 11 the pressure of springs 36 may be increased or decreased. The relationship, proportion and adjustment of these discharge valve elements are such that for any rotative speed of the pump, up to a predetermined amount A, the valves will remain substantially in the position shown in Figs. 1 and 2. The opening of the intake ports 7 is flush with the bottom 46 of the valve chambers 11 and, because of the impossibility of complete closing by the valves 35 due to surface irregularities, a small flow of oil will take place through the valves. The pressure of this oil flow will be sufficient to compress the relatively light valve springs 36 to allow a sufficient opening of the ports 7 to insure an unobstructed flow of oil through the valve chambers. At speed A the centrifugal force of the valves 35 acting against the springs 36 will cause the valves 35 to leave the position shown in Fig. 1 and any increase in rotative speed of the pump will cause the valves 35 to move centrifugally, thereby partially closing ports 31. At a predetermined rotative speed B, valves 35 will move to the position shown in Fig. 3 closing ports 31. Further centrifugal movement of valve 35 is prevented by contact with inner ends 34' of the sleeves 34.

It will be evident from the foregoing description that with valve 39 closed, and a fluid such as oil in the reservoir 27, the relative speeds between the pump casing and the output shaft 28 will vary with the oil flow through discharge ports 31, and the torque transmitted from the pump casing to the output shaft 28 will vary inversely with the oil flow through valve discharge ports 31. Furthermore, since the oil flow through valve discharge ports 31 varies inversely with the rotative speed of the pump casing, the relative speed between the pump casing and the output shaft will vary inversely with the speed of the pump casing and the torque transmitted will vary with the speed of the pump casing.

In order to limit the torque transmitted, I prefer to use the valve arrangement illustrated in Fig. 4 within the valve chambers 11. In addition to the sleeve valve 35 there is included a piston 40, a relatively heavy spring 41, and a stem 42. The stem 42 is threadably mounted at its outer end to a member 47 and is provided with a flared portion 48 at its inner end, which flared portion 48 has a cylindrical portion 48' at its outer end which is adapted to engage a central cylindrical aperture 44 provided in the piston 40. The member 47 is threadably adjustably mounted on the outer end of a valve chamber 11 and has outlet ports 45 provided therein, said member 47 being capable of adjustment to regulate the pressure exerted by the spring 41 on the piston 40 which in turn presses downwardly on the spring 36 whereby the pressure of the spring 36 against the sleeve valve 35 may be regulated. In operation, the sleeve valve 35 is moved by centrifugal force as described in connection with Fig. 3, its normal movement being limited by the shoulder 43 on the piston 40. As the static pressure in the pump increases beyond a predetermined limit, the pressure becomes sufficient to compress the spring 41, whereby the piston 11 is moved upwardly away from the cylindrical portion 48' on stem 42 thus opening the aperture 44 in the piston and allowing oil to flow through said aperture 44 thence through a portion of the chamber 11 and to then pass out through the ports 45 in the member 47. As a result of the oil flow, the torque transmitted is reduced and the possibility of damage due to overloading eliminated.

While I have described my invention with particularity, it is to be understood that I do not wish to be limited to the particular details and assemblies disclosed since various modifications within the spirit of the invention will suggest themselves to those skilled in the art.

Having described my invention, what I claim as new and wish to secure by Letters Patent is:

1. A power transmission comprising a housing, a driving shaft, a driven shaft rotatably mounted in said housing, means operatively connecting said shafts, said means including a hydraulic clutch having a rotatable casing provided with valve chambers, a reservoir adapted to contain a fluid, input and output passageways between said reservoir and housing, centrifugally actuated valves arranged for movement within said valve chambers, input and discharge ports for said valve chambers, springs maintaining said valves in a position where said input ports are restricted and said discharge ports in the valve chambers are unobstructed at low rotative speeds of said casing, and means to limit the movement of said valves to a position opening said input ports and closing said discharge ports.

2. A power transmission comprising a drive shaft, a driven shaft, an external housing, means mounted in said housing for operatively connecting said shafts, said means including a hydraulic clutch having a rotatable casing provided with valve chambers, a reservoir adapted to contain a fluid, input and output passageways between said reservoir and housing, centrifugally actuated valves arranged for movement within said chambers, input and discharge ports for said valve chambers, springs maintaining said valves in position where said input ports are restricted and said discharge ports are unobstructed at low rotative speeds of said casing, means to limit the movement of said valves to a position opening said input ports and closing said discharge ports, and means for adjusting the tension of said valve springs whereby the rotative speeds at which movement of said valves takes place may be varied.

3. A power transmission comprising a drive shaft, a driven shaft, an external housing, means mounted on said housing for operatively connecting said shafts, said means including a hydraulic clutch having a rotatable casing provided with valve chambers, a reservoir adapted to contain a fluid, input and output passageways between said reservoir and housing, a certifugally actuated valve and an adjustably operated sleeve mounted in each of said valve chambers, said valves arranged for movement within said valve chambers, input and discharge ports for said valve chambers, springs maintaining said valves in a position where said input ports are restricted and said discharge ports in the valve chambers are unobstructed at low rotative speeds of said casing, said sleeves limiting the movement of said valves to a position opening said input ports and closing said discharge ports and adapted to adjust the tension of said springs whereby the rotative speeds at which movement of said valves takes place may be varied.

4. A power transmission comprising a drive shaft, a driven shaft, an external housing, means mounted in said housing for operatively connecting said shafts, said means including a hydraulic clutch having a rotatable casing provided with valve chambers, a reservoir adapted to contain a fluid, input and output passageways between said reservoir and housing, a centrifugally actuated valve arranged for movement within each of said valve chambers, input and discharge ports for said valve chambers, caps closing said valve chambers, outlet ports in said caps, springs maintaining said valves in a position where said input ports are restricted and said discharge ports in said chambers are unobstructed at low rotative speeds of the casing, and means yieldably limiting the movement of the valves to a position opening said input ports and closing said discharge ports, said discharge ports adapted to be reopened upon further movement of said valves, said last-mentioned means comprising pistons containing apertures and arranged for movement within said chambers, means normally closing said apertures in said pistons and springs normally maintaining said pistons stationary, said pistons adapted to be actuated relative to said third-mentioned means for opening said apertures in the pistons said last mentioned springs being tensioned to allow movement of said pistons relative to said third-mentioned means and further corresponding movement of said valves upon the attainment of predetermined fluid pressure whereby said discharge ports are reopened and the pressure released through said discharge ports and also through said apertures and thence through said outlet ports.

5. A power transmission comprising a drive shaft, a driven shaft, an external housing, means mounted in said housing for operatively connecting said shafts, said means including a rotatable casing provided with valve chambers, an epicyclic gear pump mounted in said casing, a reservoir adapted to contain a fluid, input and output passageways between said reservoir and housing, centrifugally operated valves, one of each of said valves arranged for movement in one of each of said chambers, input and discharge ports for said chambers and connecting said casing in communication with said housing, springs maintaining said valves in a position where said input ports are restricted and said discharge ports in the valve chambers are unobstructed at low rotative speeds of said casing, and means to limit the movement of the valves to positions opening said input ports and closing said discharge ports.

6. A power transmission comprising a drive shaft, a driven shaft, an external housing, means mounted in said housing for operatively connecting said shafts, said means including a rotatable casing provided with valve chambers, an epicyclic gear pump provided in said casing, centrifugally operated valves, one of each of said valves arranged for movement in one of each of said valve chambers, input and discharge ports for said chambers and connecting said casing in communication with said housing, springs maintaining said valves in a position where said input ports are restricted and said discharge ports in the chambers are unobstructed at low rotative speeds of said casing, said valves adapted to be actuated to open said input ports and close said discharge ports, means to limit the movement of the valves to a position closing said ports, and means for adjusting the tension of said valve springs whereby the rotative speed of said casing at which movement of said valves takes place may be varied.

7. A power transmission comprising a drive shaft, a driven shaft, an external housing, means mounted in said housing and operatively connecting said shafts, said means including a rotatable casing provided with valve chambers, an epicyclic gear pump mounted in said housing, a reservoir adapted to contain a fluid, input and output passageways between said reservoir and housing, centrifugally operated valves, one of each of said valves arranged for movement in one of each of said chambers, members adjustably mounted on said chambers and containing output ports, intake and fluid discharge ports in said chambers, said intake and discharge ports connecting said casing in communication with said housing, springs maintaining said valves in a position where said intake ports are restricted and said discharge ports are unobstructed at low rotative speeds of said casing, said valves adapted to be actuated to open said intake ports and close said discharge ports, said discharge ports adapted to be reopened by said valves, means yieldably limiting the movement of said valves to a position closing said discharge ports, said last-mentioned means comprising pistons arranged for movement within said chambers, inlet apertures in said pistons, means normally closing said inlet apertures and springs normally maintaining said pistons stationary, said last-mentioned springs being tensioned to allow movement of said pistons relative to said third-mentioned means for opening said apertures and corresponding movement of said valves upon the attainment of a predetermined fluid pressure in said casing whereby said discharge ports are reopened and the pressure released through said discharge ports and through said apertures and outlet ports.

8. A valve for hydraulic clutches comprising a rotatable casing, a valve chamber within said casing, an intake port, outlet ports and discharge ports for said valve chamber, a sleeve valve within said valve chamber and adapted to be actuated for covering or uncovering said intake and discharge ports, a spring in said valve chamber and arranged to maintain said valve in a position such that said intake port is restricted and said discharge ports are unobstructed at low rotative speed of said casing, said valve being arranged to be moved outwardly by centrifugal force an amount depending on the speed of rotation of said casing, whereby said intake port becomes less restricted and said discharge ports become more obstructed, and means yieldably limiting the movement of said valve to a position opening said intake port and closing said discharge ports, said means comprising a piston containing an aperture and arranged for movement within said valve chamber and a spring normally maintaining said piston stationary with said piston aperture closed and adapted to be opened upon movement of said piston, said last-mentioned spring being tensioned to allow movement of said piston and correspondingly further movement of said valve upon the attainment of a predetermined pressure in said casing whereby said aperture in said piston is opened and the pressure is relieved through said aperture and outlet ports.

JOHN W. MARSH.